(12) United States Patent
Izumi et al.

(10) Patent No.: US 11,336,090 B2
(45) Date of Patent: May 17, 2022

(54) DC POWER SUPPLY AND DISTRIBUTION SYSTEM

(71) Applicant: Mitsubishi Electric Corporation, Tokyo (JP)

(72) Inventors: Kikuo Izumi, Tokyo (JP); Takushi Jimichi, Tokyo (JP); Tsuguhiro Takuno, Tokyo (JP); Yusuke Higaki, Tokyo (JP); Takuya Kataoka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/270,460

(22) PCT Filed: Oct. 25, 2019

(86) PCT No.: PCT/JP2019/041815
§ 371 (c)(1),
(2) Date: Feb. 23, 2021

(87) PCT Pub. No.: WO2020/105359
PCT Pub. Date: May 28, 2020

(65) Prior Publication Data
US 2021/0328427 A1 Oct. 21, 2021

(30) Foreign Application Priority Data
Nov. 20, 2018 (JP) .............................. JP2018-217359

(51) Int. Cl.
*H02J 1/10* (2006.01)
*H02J 7/35* (2006.01)
*H02J 3/38* (2006.01)

(52) U.S. Cl.
CPC ................ *H02J 1/10* (2013.01); *H02J 3/381* (2013.01); *H02J 7/35* (2013.01); *H02J 2300/24* (2020.01)

(58) Field of Classification Search
CPC ...... H02J 1/10; H02J 3/381; H02J 7/35; H02J 2300/24; H02J 2310/14; H02J 2310/64; H02J 1/08; H02J 1/102; Y02P 80/10
See application file for complete search history.

(56) References Cited

U.S. PATENT DOCUMENTS

2008/0179956 A1* 7/2008 Jiang ........................ H04L 12/10
307/66
2009/0296432 A1 12/2009 Chapuis
(Continued)

FOREIGN PATENT DOCUMENTS

JP 64-18498 U 1/1989
JP 4-128024 U 11/1992
(Continued)

OTHER PUBLICATIONS

International Search Report and Written Opinion dated Dec. 17, 2019, received for PCT Application PCT/JP2019/041815, Filed on Oct. 25, 2019, 10 pages including English Translation.
(Continued)

*Primary Examiner* — Toan T Vu
(74) *Attorney, Agent, or Firm* — Xsensus LLP

(57) ABSTRACT

A DC supply and distribution system includes an AC-DC converter for converting an AC power input from an AC power line to DC powers having a plurality of different voltages and outputting the converted DC powers; and a voltage controller for controlling the different voltages of the DC powers to be output from the AC-DC converter. The output DC powers are distributed to the plurality of loads
(Continued)

through a plurality of respective DC lines connected from the output terminals of the AC-DC converter.

18 Claims, 11 Drawing Sheets

(56) References Cited

U.S. PATENT DOCUMENTS

| | | | |
|---|---|---|---|
| 2013/0147273 A1* | 6/2013 | van der lee | H02J 4/00 307/31 |
| 2013/0254577 A1 | 9/2013 | Huang | |
| 2013/0329469 A1 | 12/2013 | Kubota | |
| 2015/0229127 A1 | 8/2015 | Wendt et al. | |

FOREIGN PATENT DOCUMENTS

| | | |
|---|---|---|
| JP | 2007-288846 A | 11/2007 |
| JP | 2009-178025 A | 8/2009 |
| JP | 2013-255382 A | 12/2013 |
| JP | 2013-546296 A | 12/2013 |
| JP | 2015-530667 A | 10/2015 |
| JP | 2018-182905 A | 11/2018 |
| WO | 2009/146259 A1 | 12/2009 |

OTHER PUBLICATIONS

Office Action dated Apr. 14, 2020, in corresponding Japanese patent Application No. 2020-504736, 9 pages.
European Search Report dated Dec. 20, 2021, in corresponding European Patent Application No. 19886615.4.

* cited by examiner

DC POWER SUPPLY AND DISTRIBUTION SYSTEM

CROSS-REFERENCE TO RELATED APPLICATIONS

The present application is based on PCT filing PCT/JP2019/041815, filed Oct. 25, 2019, which claims priority to JP 2018-217359, filed on Nov. 20, 2018, the entire contents of each are incorporated herein by reference.

TECHNICAL FIELD

The present invention relates to DC power supply and distribution systems for supplying and distributing DC powers to a plurality of loads.

BACKGROUND ARTS

In recent years, in order to utilize renewable energy or to cope with a power line outage, solar photovoltaic power generators, storage batteries, and the likes have been installed for ordinary houses, office buildings, factories, station buildings, and the like. Most of solar photovoltaic power generators and storage batteries output DC power. Hence, an AC power supply and distribution system needs to once convert, by a DC-AC converter, DC power output from a solar photovoltaic power generator, the storage battery, and/or the like (hereinafter, simply referred to DC power sources) to AC power equivalent to that supplied from an AC power line, for example, AC power of 100 V or other voltage, and then to convert again the converted AC power on load sides to a DC power by an AC-DC converter.

A DC power supply and distribution system, on the other hand, converts AC power from an AC power line to a DC power by means of an AC-DC converter and does not converts a DC power output from an DC power source to an AC power, to supply the DC powers to loads. That is, the DC power supply and distribution system needs less number of power conversions for supplying the power from the DC power source to loads compared with the AC power supply and distribution system, thus being able to reduce power loss entailed in the power conversions. Moreover, the DC power supply and distribution system does not need to provide AC-DC converters for the respective loads, thus improving cost-effectiveness.

For example, Patent Document 1 discloses a house wiring that includes a transformer and a rectifier disposed at an appropriate position between a domestic distribution board and AC power outlets, and the AC power from a commercial power source is transformed to AC powers having a plurality of different voltages by the transformer and then the AC powers are rectified to respective DC powers by the rectifier, to output the rectified DC powers to DC power output terminals through DC power supply lines.

Moreover, Patent Document 2 discloses a DC distribution system that includes a main panel board accommodating an AC-DC converter for converting the AC power supplied from an AC power line to a DC power and a plurality of sub-panel boards accommodating respective DC-DC converters for converting the DC power supplied from the main power board to DC powers having desired voltage levels different from each other in accordance with DC devices.

PRIOR ART DOCUMENTS

Patent Documents

Patent Document 1: Japanese Unexamined Utility Model Application Publication No. H04-128024.

Patent Document 2: Japanese Unexamined Patent Application Publication No. 2009-178025.

SUMMARY OF THE INVENTION

Problem that the Invention is to Solve

In a case of converting the power output from an AC power line to DC powers having a plurality of different voltages and outputting the DC powers, however, a conventional DC power supply and distribution system has a problem of not being able to control individually the plurality of different voltages of the DC power powers.

The present invention discloses a technology for resolving the problem as described above and aims at providing a DC power supply and distribution system that improves power distribution efficiency, in a case of converting an AC power input from an AC power line to DC powers having a plurality of different voltages, by controlling the voltages of the respective DC powers.

MEANS FOR SOLVING THE PROBLEM

A DC power supply and distribution system disclosed in the present invention includes an AC-DC converter configured to convert an AC power input from an AC power line to DC powers having a plurality of different voltages and to output the DC powers from respective output terminals of the AC-DC converter; a voltage controller configured to control the different voltages of the DC powers to be output from the AC-DC converter 40; a plurality of first DC lines connected from the respective output terminals of the AC-DC converter, for distributing to a plurality of loads the DC powers with the different voltages output from the AC-DC converter; and load condition detectors configured to detect conditions of the loads, wherein the voltage controller determines, based on the conditions of the loads detected by the load condition detectors, allowable voltage ranges between highest allowable minimum input voltages and lowest allowable maximum input voltages among allowable minimum input voltages and allowable maximum input voltages of the loads connected from the AC-DC converter through the first DC lines, and calculates, within the allowable voltage ranges, the different voltages of the DC powers so that an overall efficiency of the loads is improved, to control the AC-DC converter to output the DC powers with the calculated voltages to the respective first DC lines.

Advantage Effect of the Invention

According to a DC power supply and distribution system disclosed in the present invention, since an AC-DC converter converts an AC power input from an AC power line to DC powers having a plurality of different voltages each controlled by a voltage controller and outputs the DC powers to a plurality of respective DC lines, DC powers having voltages in accordance with a plurality of loads connected from the DC lines, thus being able to improve the power distribution efficiency.

DETAILED DESCRIPTION OF THE INVENTION

Hereinafter, Embodiments for carrying out the inventions are described with reference to the drawings.

Embodiment 1

Figure 1:
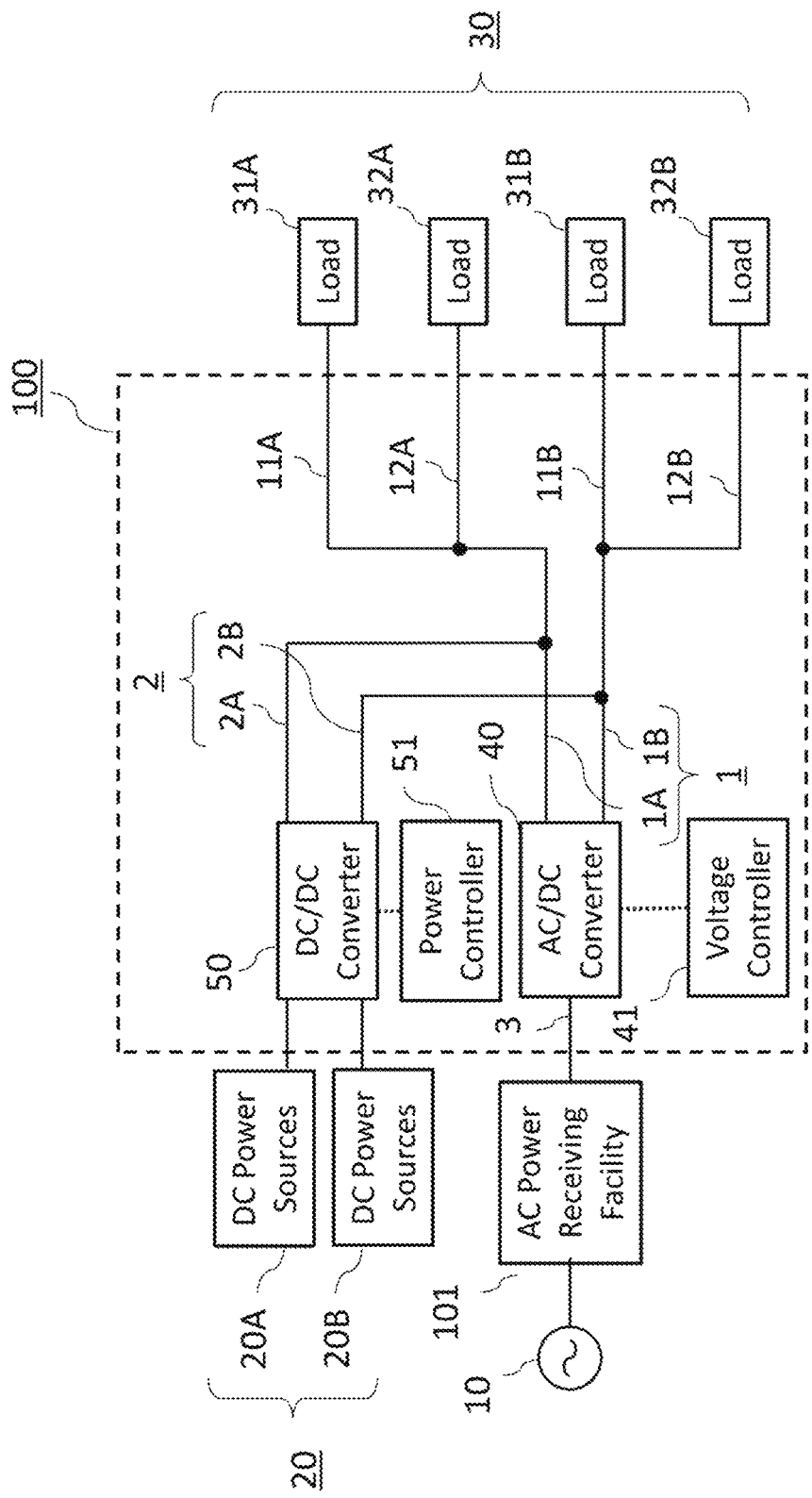
FIG. 1 is a schematic diagram showing a configuration of a DC power supply and distribution system according to Embodiment 1 of the present invention.

FIG. 1 is a schematic diagram showing a configuration of a DC power supply and distribution system according to Embodiment 1 of the present invention. Referring to FIG. 1, the DC supply and distribution system 100 is for supplying powers input from an AC power line 10 and from DC power sources 20 to a plurality of loads 30 and includes an AC-DC converter 40 for converting an AC power from the AC power line 10 to DC powers and outputting the DC powers; a voltage controller 41 for controlling the voltages of the DC powers to be output from the AC-DC converter 40; and a plurality of DC power lines 1 (first DC power lines 1) connected from the AC-DC converter 40.

The DC supply and distribution system 100 is applied to, for example, an ordinary house, an office building, a factory, a station building, and the like. The AC power line 10 is, for example, a commercial power line for an electric power company to supply a commercial power. The AC power from the AC power line 10 is received by an AC power receiving facility 101 and is converted to the DC powers by the AC-DC converter 40. The DC powers converted by the AC-DC converter 40 are supplied to the loads 30 through a distribution network of the DC lines and via, for example, DC outlets (not shown) or the likes.

An AC line 3 for transmitting the AC power input from the AC power line 10 via the AC power receiving facility 101 is connected to the input side of the AC-DC converter 40. The DC lines 1 are connected from the output side of the AC-DC converter 40 to distribute the DC powers to the load 30. The DC lines 1 are provided, for example, for respective types of the loads 30; in other words, a plurality of loads of the loads 30 connected from each of the DC lines 1 are the same type as each other. Note that each of the DC lines 1, which is a pair of lines, for example, a positive line and a negative line, is expressed as a single line in FIG. 1. Similarly, the AC line 3, which is, for example, a single-phase three-wire system or a three-phase three-wire system, is expressed as a single line in FIG. 1.

The types of the loads 30 are categorized according to, for example, their daily power-usage characteristics, their optimum operating voltages for respective operating conditions, and the likes. In the case of applying the DC power supply and distribution system 100 to an ordinary house, an office building, a station building, and the like, the types of loads 30 are categorized into, for example, general loads such as lighting loads and office automation equipment, and general kinetic loads such as air-conditioning loads and elevators. In a case of applying the DC supply and distribution system 100 to a factory, the types of loads 30 are categorized into, for example, general loads such as lighting loads and office automation equipment, and general kinetic loads such as air-conditioning loads and elevators, and factory kinetic loads such as conveyers and press machines. The general kinetic loads and the factory kinetic loads, and the lighting loads and the general loads, which operating characteristics are significantly different from each other, are preferably categorized at least as different types of the loads 30.

FIG. 1 shows, as an example, that two DC lines 1A, 1B connected from the AC-DC converter 40. The DC line 1A is further branched out into two DC lines 11A, 12A toward the load, and the two respective DC lines are connected to the same type loads 31A, 32A. Also, the DC line 1B is further branched out into two DC lines 11B, 12B toward the load, and the two respective DC lines are connected to the same type loads 31B, 32B.

Even though the DC lines are further branched in this way between the AC-DC converter 40 and the loads, the same types of the loads 30 are preferably connected from the AC-DC converter 40 through the respective DC lines 1. While FIG. 1 shows, as an example, that the number of types of the loads 30 is two and the number of DC lines 1 connected from the AC-DC converter 40 is two, the numbers of types of the loads 30 and of DC lines 1 may be two or more. Also, while FIG. 1 shows, as an example, that the DC lines 1A, 1B each are branched out into two lines, the DC lines 1A, 1B each may be branched out into two or more lines.

The AC-DC converter 40 converts the AC power input from the AC power line 10 via the AC power receiving facility 101 to the DC powers having a plurality of different voltages, to output the DC powers of different voltages to the respective DC lines 1. For example, the AC-DC converter 40 converts the AC power from the AC power line 10 to DC powers having two different voltages Va, Vb, and outputs the DC power with the voltage Va to the DC line 1A to supply the DC power to the loads 31A, 32A and outputs the DC power with the voltage Vb to the DC line 1B to supply the DC power to the loads 31B, 32B.

The voltage controller 41 controls the AC-DC converter 40 so that the DC powers to be output from the AC-DC converter 40 to the respective DC lines 1 have predetermined voltages. For example, in a case of providing for the types of the loads 30 the respective DC lines 1 connected from the AC-DC converter 40 as shown in FIG. 1, the voltage controller 41 controls the AC-DC converter 40 so that the DC powers to be output from the AC-DC converter 40 have respective voltages in accordance with the types of loads 30.

The voltage controller 41 detects, for example, output voltages of the AC-DC converter 40, sets target voltages that satisfy constraints on the distribution voltages, and send a command signal to the AC-DC converter 40 to control the AC-DC converter 40.

The constraints on the distribution voltages are, for example, allowable minimum input voltages and allowable maximum input voltages of the loads 30. The allowable minimum input voltages depend on allowable operating voltages of the internal power supplies and the like of the loads 30, and the allowable maximum input voltages depend on withstand voltages of the loads 30, heat generation due to loss therein, and the like. In Embodiment 1, the same types of the loads 30 are connected from the AC-DC converter 40 through the respective DC lines 1. For that reason, the voltage controller 41, when controls the different voltages of the DC powers to be output from the AC-DC converter 40, sets the voltages to satisfy constraints on the distribution voltages for all loads 30 connected from the AC-DC converter 40 through the respective DC lines 1.

Note that the voltage controller 41 may stop supplying the DC powers output from the AC-DC converter 40 to the DC lines if detects a higher voltage due to, for example, a short circuit or the like in the DC lines 1, than the voltage of the DC powers to be output.

Since AC-DC converter 40 is thus provided with the voltage controller 41 for controlling the different voltages of the DC powers to be output from the AC-DC converter 40 to the respective DC lines 1, the DC powers with voltages in accordance with the loads 30 connected from the DC lines 1 can be supplied, thus be able to improve the power distribution efficiency. Moreover, since the voltage controller 41 controls the different voltages of the DC powers to be output from the AC-DC converter 40 to satisfy the constraints on the distribution voltages, DC powers required for the loads 30 can be stably supplied even during operation thereof.

Furthermore, in the case of providing the respective DC lines 1 for the same types of the loads 30, in other words, in the case of connecting the same types of the loads 30 from the AC-DC converter 40 through the respective DC lines 1, the AC-DC converter 40 can supply the DC powers with voltages in accordance with the same type loads, thus being able to further improve the power distribution efficiency.

The voltage controller 41 is a microcomputer including, for example, a central processing unit (CPU), a read only memory (ROM), a random access memory (RAM), and the like. The CPU reads-out programs stored in the ROM and transfers them to the RAM, to execute various processes in accordance with the programs.

Figure 2:
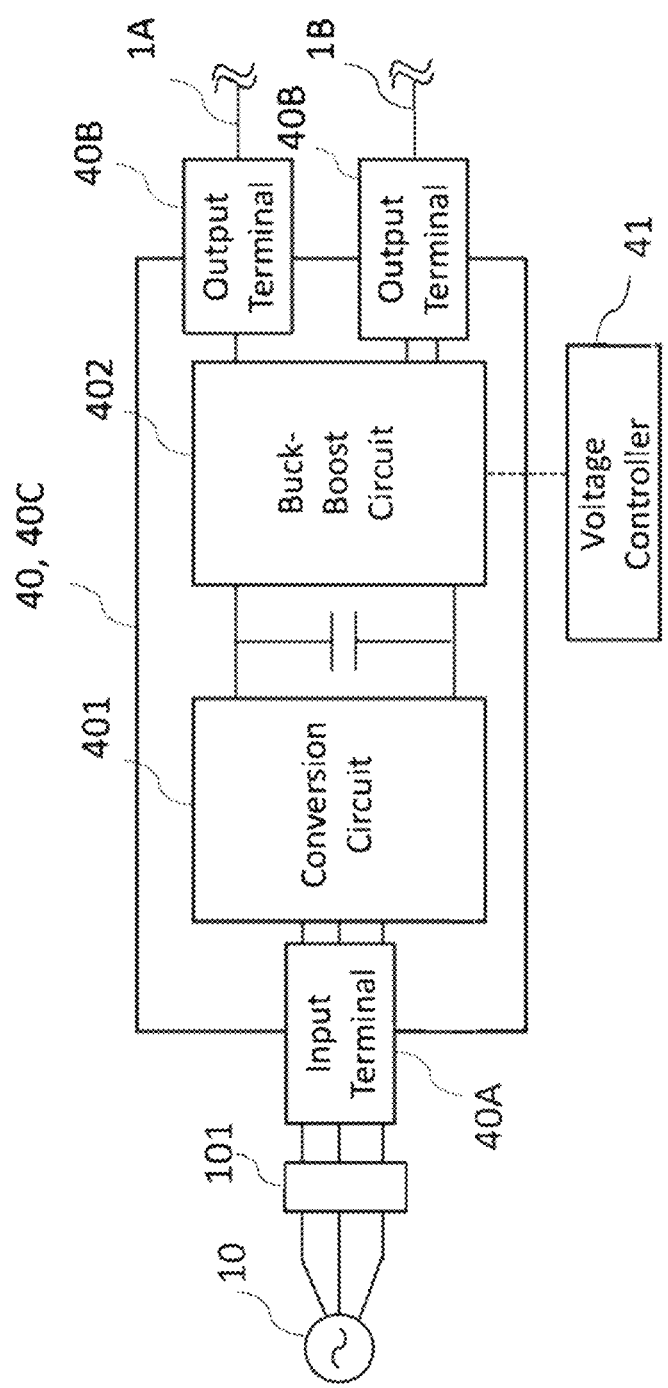
FIG. 2 is a schematic diagram showing a configuration of an AC-DC converter and a voltage controller, of the DC power supply and distribution system according to Embodiment 1.

FIG. 2 is a schematic diagram showing a configuration of the AC-DC converter and the voltage controller, of the DC supply and distribution system according to Embodiment 1. The AC-DC converter 40 includes, for example, an AC-DC conversion circuit 401 for converting the AC power to the DC power and a buck-boost circuit 402 for boosting or stepping-down the converted DC power.

The buck-boost circuit 402 converts the DC power converted by the AC-DC conversion circuit 401 to the DC powers having the different voltages to output the converted DC powers to the respective DC lines 1. The buck-boost circuit 402 has, for example, semiconductor switching elements and boosts or steps down the voltages of the DC power output from the AC-DC conversion circuit 401 to predetermined voltages by switching the semiconductor switching elements in accordance with the command signal sent from the voltage controller 41.

The AC-DC conversion circuit 401 and the buck-boost circuit 402 are integrated in a single casing 40C. The casing 40C has, for example, an input terminal 40A for connecting the AC line 3 and a plurality of output terminals 40B for connecting the respective DC lines 1. Note that each output terminal 40B may have a pair of output terminals, for example, a positive one and a negative one.

In this way, since the AC-DC converter 40 integrated in the single casing 40C converts the AC power to the DC powers with different voltages and outputs the DC powers, the AC power can be converted from the AC power to the DC powers having the plurality of different voltages without providing a plurality of power converters for the respective types of the loads 30, thus being able to reduce the system cost.

Note that the AC-DC converter 40 is not limited to that having the configuration shown in FIG. 2 but may have any configuration as long as it converts AC power to DC powers having a plurality of different voltages and outputs the respective DC powers. Moreover, the voltage controller 41 may be provided in the same casing 40C as that the AC-DC converter 40 is integrated in or may be provided as a controller in another casing.

The DC power sources 20 are for supplying DC powers and are, for example, a solar photovoltaic power generator and/or a wind power generator, an electric vehicle (EV) and/or a storage battery, and/or the like. The solar photovoltaic power generator and the wind power generator supply generated DC power, and the electric vehicle (EV) and the storage battery supply stored DC power. While FIG. 1 shows, as an example, that DC power sources 20 are the two DC power sources 20A and 20B, the number thereof may be one, or two or more.

On the output sides of the DC power sources 20, a DC-DC converter 50 is provided. The output terminals of the DC-DC converter 50 are connected to a plurality of respective DC lines 2 (second DC lines 2) for distributing DC powers to the loads 30. The DC-DC converter 50 converts the DC powers input from the DC power sources 20 to DC powers having a plurality of different voltages, to output the converted DC powers to the respective DC lines 2. The DC-DC converter 50 is integrated in, for example, a single casing and provided with a buck-boost circuit (not shown) for boosting or stepping down DC powers to those having the different voltages to output.

In the example shown in FIG. 1, two DC lines 2A, 2B are connected from the DC-DC converter 50. The DC lines 2A, 2B connected from the DC-DC converter 50 are respectively connected to the DC lines 1A, 1B connected between the AC-DC converter 40 and the loads 30. The same types of the loads 30 are preferably connected from the DC-DC converter 50 through the respective DC lines 2A, 2B. The DC powers with the same voltage are supplied to the respective DC lines 1A, 2A connected with each other, and the other DC powers with another same voltage are supplied to the respective DC lines 1B, 2B connected with each other.

Since the DC lines 2 connected from the DC-DC converter 50 are respectively connected in this way to the DC lines 1 midway between the AC-DC converter 40 and the loads 30, the number of power conversions can be reduces, thus being able to reduce loss entailed in the power conversion.

A power controller 51 controls a plurality of different voltages of DC powers to be output from the DC-DC converter 50. The power controller 51 set respective target powers for the DC power sources 20 and detects, for example, the voltages to be output from the DC-DC converter 50, to control the DC-DC converter 50 by sending a command signal so that DC powers input from the DC power sources 20 are within the target powers and the converted DC powers have the detected voltages. The power controller 51 is a microcomputer including, for example, a CPU, a ROM, a RAM, and the like.

Figure 3:
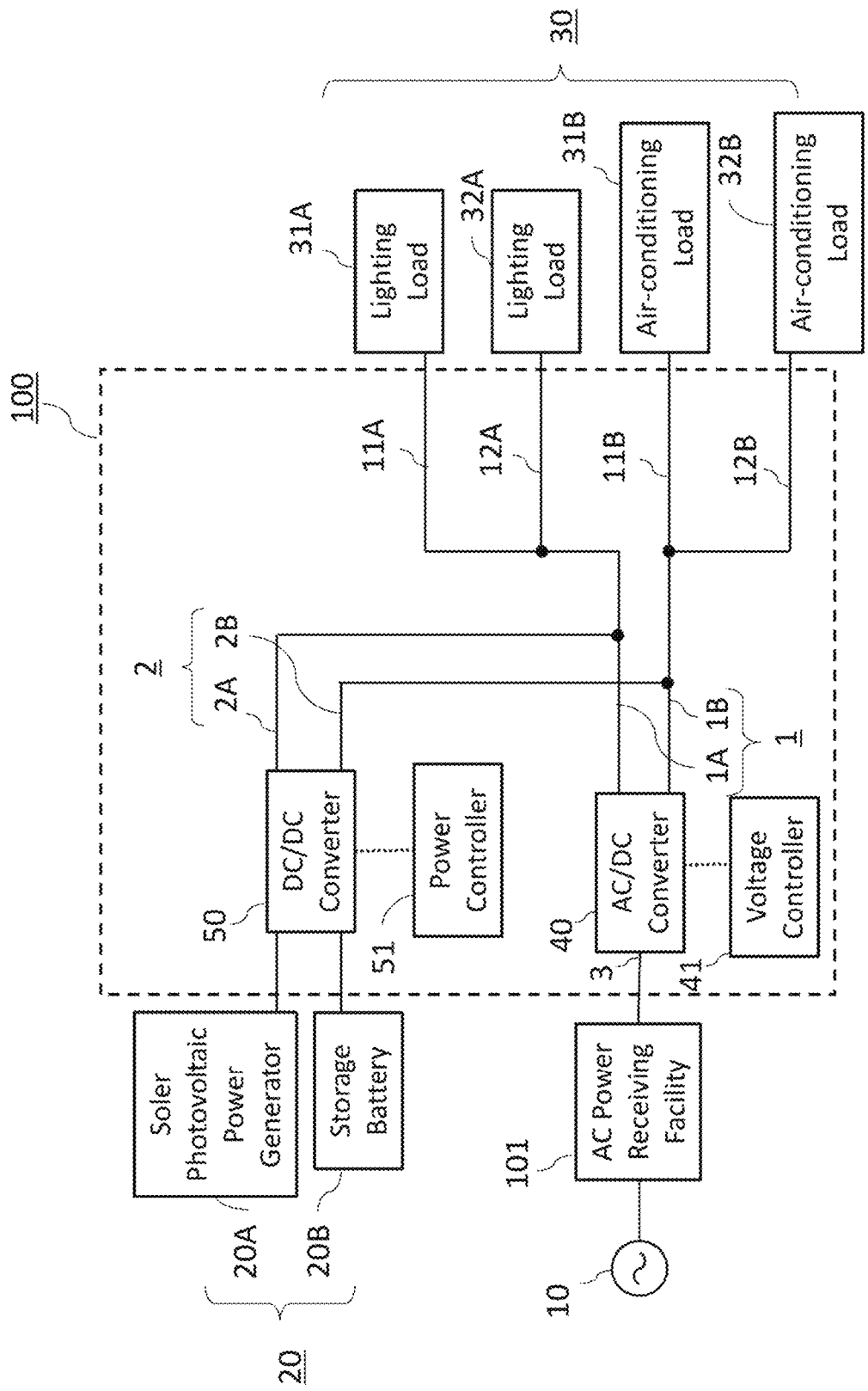
FIG. 3 is a schematic diagram showing a configuration example applied with the DC power supply and distribution system according to Embodiment 1.

FIG. 3 is a schematic diagram showing a configuration example of the DC supply and distribution system according to Embodiment 1. FIG. 3 shows, as an example, that the DC power sources 20 are a solar photovoltaic power generator 20A and a storage battery 20B, and the DC lines 1A are connected to lighting loads designated at 31A, 32A and the DC line 1B is connected to air-conditioning loads designated at 31B, 32B.

The solar photovoltaic power generator 20A generates a maximum power from current solar energy. The amount of the power generated by the solar photovoltaic power generator 20A and supplied to the loads 30 is equal to reduction amount of the purchased power from the AC power line 10.

The storage battery 20B charges and discharges the unstable output power of the solar photovoltaic power generator 20A to supply power to the loads 30. Moreover, the storage battery 20B is charged from an AC power line during cheaper electricity-rate hours in nighttime, and discharges the charged power to the loads 30 during higher electricity-rate hours in daytime. Operating in this way can reduce the electricity bill by the difference in electricity rates.

The power amounts output from the solar photovoltaic power generator 20A and the storage battery 20B are controlled to reduce the purchased power from the AC power line 10. In particular, the power amount output from the storage battery 20B is controlled so that the purchased power, which is the AC power input from the AC power line 10 to the AC-DC converter 40 through the AC line 3, is reduced within a predetermined command power. The DC powers output from the solar photovoltaic power generator 20A and the storage battery 20B may be supplied to any of the loads 30 as long as a predetermined command power can be supplied to the loads 30.

As described above, the DC supply and distribution system 100 according to Embodiment 1 includes the AC-DC converter 40 for converting the AC power input from the AC power line 10 to DC powers having the plurality of different voltages to output the converted DC powers from the respective output terminals 40B; the voltage controller 41 for controlling the different voltages of the DC powers to be output from the AC-DC converter 40; and the plurality of first DC lines connected from the respective output terminals 40B of the AC-DC converter 40, for respectively distributing to the same type of the plurality of loads 30 the DC powers with different voltage output from the AC-DC converter 40.

In this way, in the DC power supply and distribution system 100, since the voltage controller 41 controls the plurality of different voltages of the DC powers to be output from the AC-DC converter 40 and the AC-DC converter 40 converts the AC power input from the AC power line 10 to the DC powers having the different voltages controlled by the voltage controller 41 to output the converted DC powers to the plurality of respective DC lines 1, the DC powers with voltages in accordance with the types of the loads 30, connected from the respective DC lines 1 can be supplied, thus being able to improve the power distribution efficiency.

Moreover, since the AC-DC converter 40 integrated in the single casing 40C outputs the DC powers with different voltages to the respective DC lines, the power distribution efficiency can be improved without providing power converters changing voltages for the respective types of the loads 30, thus being able to reduce the system cost.

Embodiment 2

Figure 4:
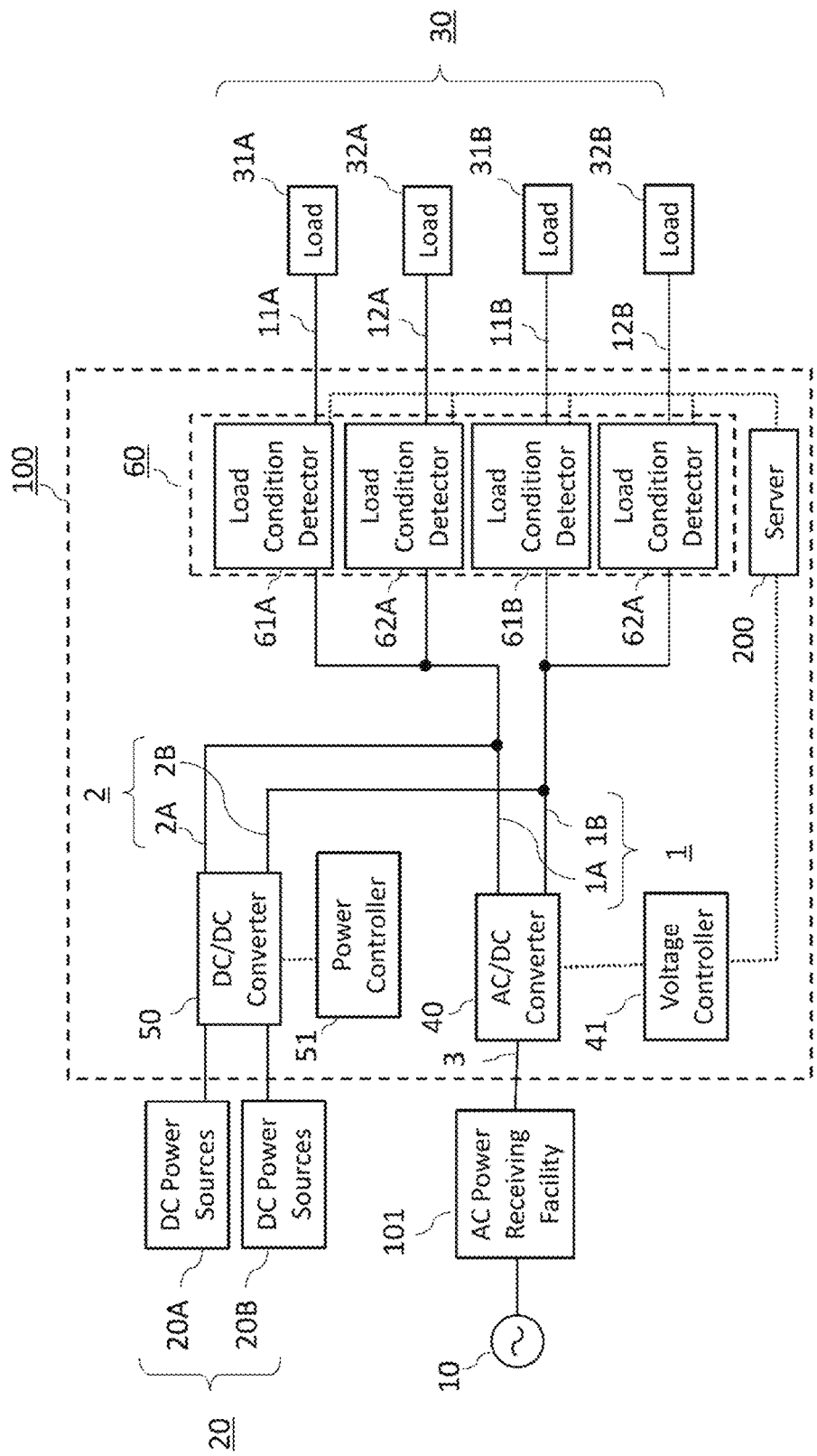
FIG. 4 is a schematic diagram showing a configuration of a DC power supply and distribution system according to Embodiment 2 of the present invention.

FIG. 4 is a schematic diagram showing a configuration of a DC power supply and distribution system according to Embodiment 2 of the present invention. As shown in FIG. 4, the DC supply and distribution system 100 according to Embodiment 2 further includes load condition detectors 60 for detecting the conditions of the loads 30. The same descriptions as those in Embodiment 1 are omitted here, and differences therefrom are mainly described in the following.

The AC-DC converter 40 converts the AC power to DC powers having a plurality of different voltages to output the DC powers with different voltages to the respective DC lines 1 connected therefrom The respective DC lines 1 connected from the AC-DC converter 40 are connected to the same types of a plurality of the loads 30. Put differently, the same types of the loads 30, connected from the AC-DC converter 40 through the respective DC lines 1 are driven at the same voltages.

FIG. 4 shows, as an example, that two DC lines 1A, 1B connected from the AC-DC converter 40. The DC line 1A is further branched out into two DC lines 11A, 12A toward the load, and the two respective DC lines are connected to the same type loads 31A, 32A. Also, the DC line 1B further branches to two DC lines 11B, 12B toward the load, and the two respective DC lines are connected to the same type loads 31B, 32B.

The DC supply and distribution system 100 has flexibility in its distribution voltages compared with an AC supply and distribution system standardized in distribution voltages.

Accordingly, varying the distribution voltages in accordance with the conditions of the loads 30 can improve the efficiency in some cases. In Embodiment 2, the voltage controller 41 varies the voltage output from the AC-DC converter 40 based on the respective conditions of the loads 30 detected by the load condition detector 60.

The load condition detectors 60 detect the respective conditions of the loads 30. The load condition detectors 60, in a case of being provided, for example, to the respective DC lines 11A, 12A, 11B, 12B, detect as the conditions of the loads 30, for example, the currents and the powers flowing through the respective DC lines and load factors. In a case of being provided inside the devices of the loads 30, the load condition detectors 60 may detect the operating states of the loads 30 as the conditions thereof. In a case of some of the loads 30 being, for example, air-conditioning loads, the operating states of the loads 30 here referred to are the rotating speed and the like of the compressors.

The voltage controller 41 controls the different voltages of the DC powers to be output from the AC-DC converter 40, based on the conditions of the loads 30 detected by the load condition detectors 60. The load condition detectors 60 and the voltage controller 41 are communicatably connected to each other by, for example, wire or wireless.

As shown in FIG. 4, a server 200 for acquiring the conditions of the loads 30 detected by the load condition detectors 60 may be connected between the load condition detectors 60 and the voltage controller 41. The server 200 may be connected to an external network, such as the internet, to externally monitor the conditions of the loads 30.

By further providing the load condition detectors 60 in this way, the voltage controller 41 can control so that the DC powers to be output from the AC-DC converter 40 have different voltage in accordance with the conditions of the loads 30, thus being able to further improve the power distribution efficiency.

At this time, the voltage controller 41 further preferably controls the voltages of the DC powers to be output to the loads 30, connected from the AC-DC converter 40 through the respective DC lines 1 so that the loads are driven at their maximum overall power efficiency while satisfying the constraints on the distribution voltages. The power efficiency here referred to is, for example, the ratio of powers consumed by the operation of the load(s) 30 to those supplied thereto.

Depending on the types of loads 30, the constraints on the distribution voltages vary in some cases in accordance with the conditions of the loads 30. For example, the allowable minimum input voltages and the allowable maximum input voltages vary depending on the load factors of the loads 30. To be more specific, even though the same types of the loads 30, connected from the AC-DC converter 40 through the respective DC lines 1, the allowable minimum input voltages and the allowable maximum input voltages of the same type loads may in some cases be different from each other depending on their load factors.

Moreover, voltages that maximize the power efficiencies (hereinafter, referred to as optimum operating voltages) may vary in some case depending on the conditions of the loads 30. The optimum operating voltages vary depending on, for example, the load factors of the loads 30. To be more specific, even though the same types of the loads 30, connected from the AC-DC converter 40 through the respective DC lines 1, the optimum operating voltages may in some cases be different from each other depending on their loads factors.

Hence, the voltage controller 41 determines a highest allowable minimum input voltage and a lowest allowable maximum input voltage among the allowable minimum input voltages and the allowable maximum input voltages of the same types of the loads 30, connected from the AC-DC converter 40 through the respective DC lines 1, based on the conditions of the same type loads detected by the load condition detectors 60 provided for the respective loads 30, and defines as allowable voltage ranges the range between the highest allowable minimum input voltage and the lowest allowable maximum input voltage to set, within the allowable voltage range, a voltage that maximizes the overall power efficiency for the same type loads.

Put differently, the voltage controller 41, when sets voltages that maximize the overall power efficiencies for the same types of the loads 30, detects or calculates respective losses in the same types of the loads 30 at voltages within allowable voltage ranges to set voltages that maximize the losses as voltages that maximize the power efficiencies.

The following describes specifically as an example the operation of the voltage controller 41 when sets the voltage output to the DC line 1A so that the power efficiencies of the loads 31A, 32A connected from the DC line 1A are maximal within the allowable voltage range thereof.

Figure 5:
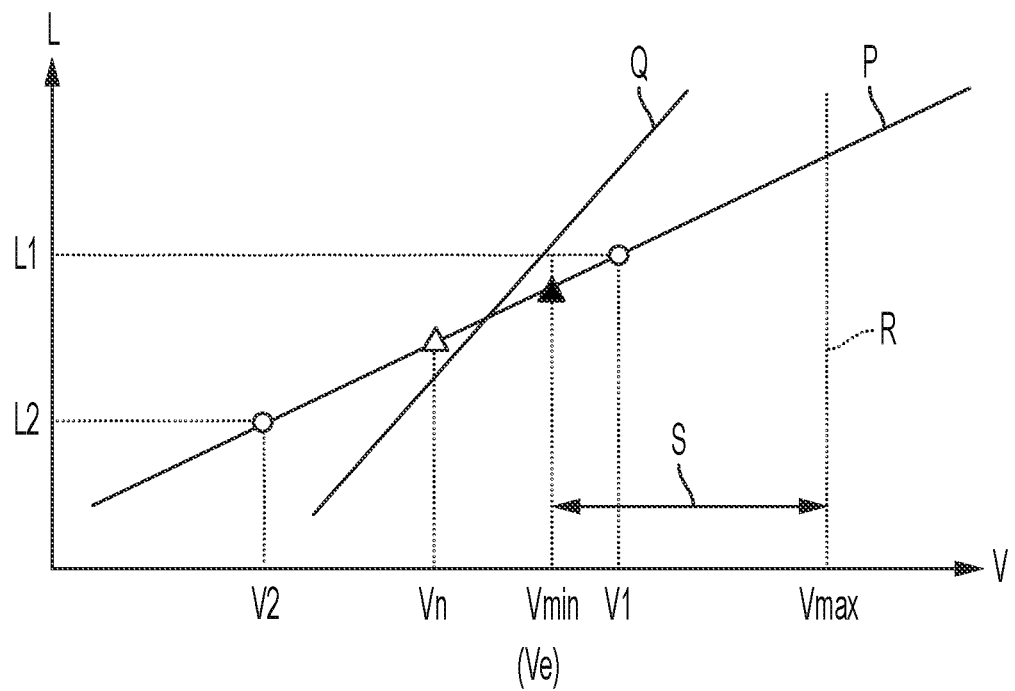
FIG. 5 is a graph for explaining a voltage controller of the DC power supply and distribution system according to Embodiment 2.

FIG. 5 is a graph for explaining the voltage controller of the DC power supply and distribution system according to Embodiment 2, and shows a relationship between a load factor of a load and a voltage supplied thereto. The vertical axis represents the load factor L, and the horizontal axis represents the voltage V supplied to the load. It is assumed as an example that an optimum operation voltage for a load factor is expressed by a straight line P, an allowable minimum input voltage for the load factor is expressed by a straight line Q; and the allowable maximum input voltage for the load factor is constant independent of the load factor and expressed by a straight line R, as shown in FIG. 5.

The voltage controller 41 acquires, from the load condition detectors 61A, 62A, information on the load factor L1 of the load 31A and the load factor L2 of the load 32A as the conditions of these loads, to calculate respective optimum operating voltages V1, V2 for the load factor L1 and the load factor L2. Assuming that there are no constraints on the distribution voltages, the voltage controller 41 calculates a voltage Vn that maximizes the overall power efficiency for the same type loads 31A, 32A. The voltage Vn that maximizes the overall power efficiency of loads 31A, 32A under no constraints on the distribution voltages is, for example, the average of the optimum operating voltage V1 at the loads factor L1 and the optimum operating voltage V2 at the loads factor L2.

The voltage controller 41 further calculates the allowable minimum input voltages for the load factors L1, L2 to determine the highest allowable minimum input voltage Vmin among them. In FIG. 5, the highest allowable minimum input voltage Vmin is the voltage at the intersection of the line of the load factor L1 and the straight line Q. Since the allowable maximum input voltages are, for example, constant irrespective of the load factors, the constant voltage is determined as to be the lowest allowable maximum input voltages Vmax of the loads 31A, 32A.

The allowable voltage range S is between the highest allowable minimum input voltage Vmin and the lowest allowable maximum input voltage Vmax among the allowable minimum input voltages and the allowable maximum input voltages of the loads 31A, 32A. A voltage within the allowable voltage range S, closest to the voltage Vn that maximizes the power efficiency under no constraints on the distribution voltages is determined as a voltage Ve that maximizes the overall power efficiency for the loads 31A, 32A. In FIG. 5, the voltage Ve is the allowable minimum input voltage Vmin for the load factor L1. In this way, the voltage controller 41 can be set within the allowable voltage range S the voltage Ve that maximizes the overall power efficiency for the loads 31A, 32A.

Similarly, the voltage controller 41 receives the conditions of the loads 31B, 32B from the load condition detectors 61B, 62B connected in the DC line 1B to determine the highest allowable minimum input voltage and the lowest allowable maximum input voltage for the loads 31B, 32B, and sets within their allowable voltage range a voltage that maximizes the overall power efficiency of the loads 31B, 32B. The voltage controller 41 controls the AC-DC converter 40 to output the DC powers with the respective voltages set for the DC lines 1A, 1B.

At this time, the voltage controller 41 stores a database containing relationships between, for example, the load factors, the allowable minimum input voltages, the allowable maximum input voltages, the optimum operating voltages, and the like to set the output voltages of the DC powers based on the database. The database may be obtained by the server 200, for example, from two-dimensional barcodes provided to the respective loads 30 or through an external network such as the internet, or by input of the user by means of the screen of the server 200.

As described above, in the DC supply and distribution system 100 according to Embodiment 2, since the AC-DC converter 40 converts the AC power input from the AC power line 10 to the DC powers having the plurality of different voltages controlled by the voltage controller 41 and outputs the converted DC powers to the plurality of respective DC lines 1, the DC powers with respective voltages in accordance with the same types of loads 30, connected from the respective DC lines 1 can be supplied, thus being able to improve the power distribution efficiency. Moreover, since Embodiment 2 provides the load condition detectors 60, the voltage controller 41 can control depending on the conditions of the loads 30 the different voltages of the DC powers to be output from the AC-DC converter 40, thus being able to further improve the power distribution efficiency.

Furthermore, the voltage controller 41 sets the voltages of the DC powers that maximize the respective overall power efficiencies for the same types of the loads 30, based on the conditions of the loads 30 detected by the load condition detectors 60 while satisfying the constraints on the distribution voltages for the same types of the loads 30, connected from the AC-DC converter 40 through the respective DC lines 1.

This allows the overall power efficiency of the DC supply and distribution system 100 to be improved while suppressing occurrence of failure, halt, or the like of the loads 30 even in the case of driving the same types of the loads 30 at respective same voltages, thus being able to overall power efficiency of the DC supply and distribution system 100.

Embodiment 3

Figure 6:
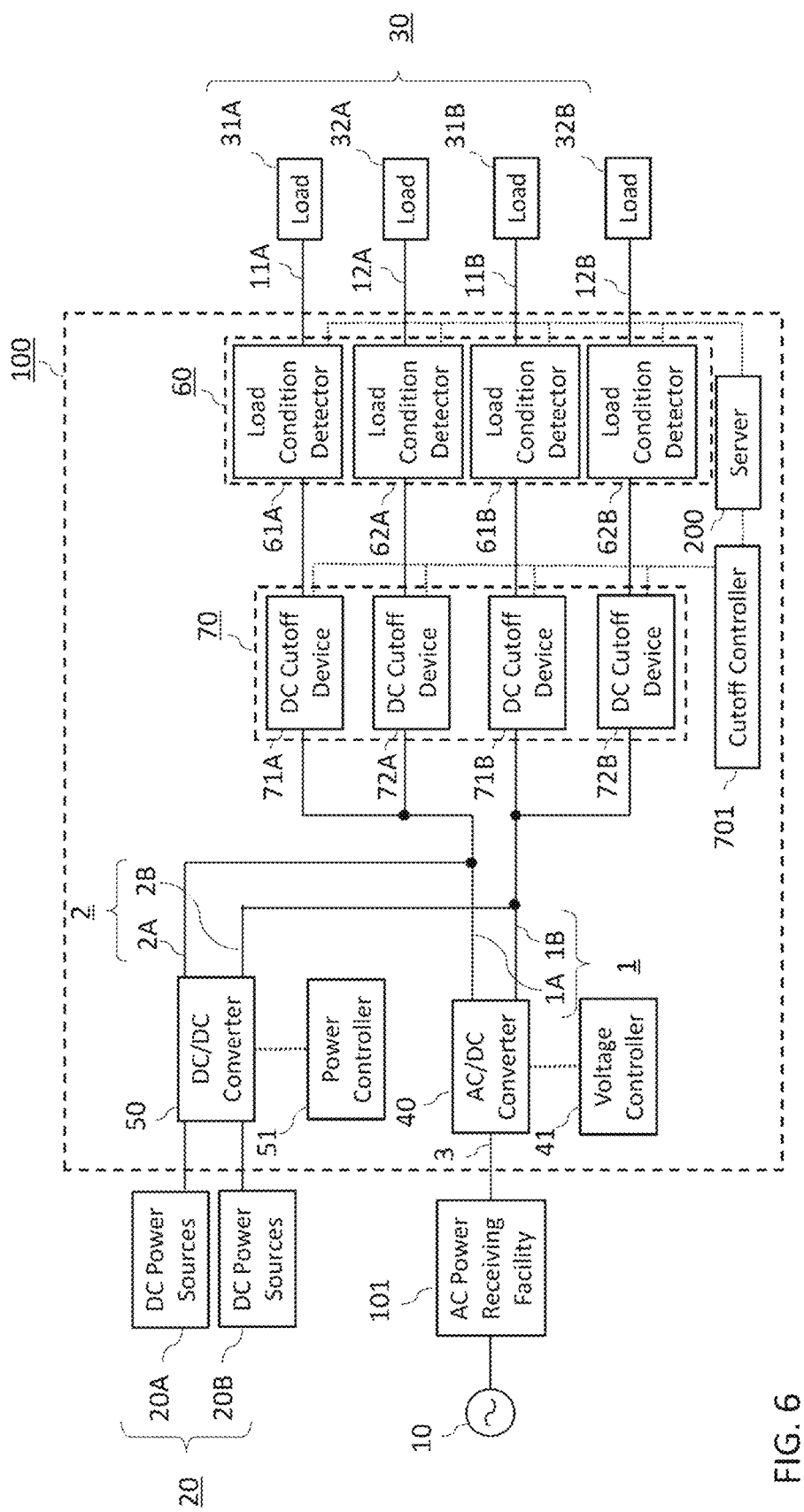
FIG. 6 is a schematic diagram showing a configuration of a DC power supply and distribution system according to Embodiment 3 of the present invention.

FIG. 6 is a schematic diagram showing a configuration of a DC power supply and distribution system according to Embodiment 3 of the present invention. As shown in FIG. 6, the DC power supply and distribution system 100 according to Embodiment 3 further includes the load condition detectors 60 for detecting the conditions of the loads 30; and DC cutoff devices 70 for cut off the respective DC powers supplied to the loads 30. The same descriptions as those in Embodiments 1 and 2 are omitted here, and differences therefrom are mainly described in the following.

The load condition detectors 60 are, for example, respectively provided for the loads 30 to detect the conditions of the loads 30. FIG. 6 shows, as an example, that the load condition detectors 61A, 62A, 61B, 62B are provided in the DC lines 11A, 12A, 11B, 12B connected to the loads 31A, 32A, 31B, 32B, respectively.

The DC cutoff devices 70 are, for example, provided for the respective loads 30. FIG. 6 shows, as an example, that the DC cutoff devices 71A, 72A, 71B, 72B are provided in the DC lines 11A, 12A, 11B, 12B connected to the loads 31A, 32A, 31B, 32B, respectively.

The DC cutoff devices 70 are provided with a cutoff controller 701. The cutoff controller 701 receives the conditions of the loads 30 from the load condition detectors 60 to command the DC cutoff devices 70 to cut off or transmit the DC powers depending on the conditions of the loads 30. The load condition detectors 60 and the DC cutoff devices 70 are communicatably connected to each other by, for example, wire or wireless, and may be connected, for example, via a server 200 for acquiring the conditions of the loads 30 as shown in FIG. 6.

It is further preferable that the DC cutoff devices 70 and the cutoff controller 701 are provided at places separated from each other and the cutoff controller 701 is configured to remotely command the DC cutoff devices 70 to transmit and cut off the DC powers. The cutoff controller 701 is simply required to be able to acquire the conditions of the loads 30 from the load condition detectors 60 and may command, via the voltage controller 41 of the AC-DC converter 40 or the server 200 the DC cutoff devices 70 to cut off and transmit the DC powers. This allows for easily controlling the DC powers even in a case difficult to perform human work depending on the types of the loads 30 and on the structure of a building that the DC supply and distribution system 100 is installed.

Figure 7:
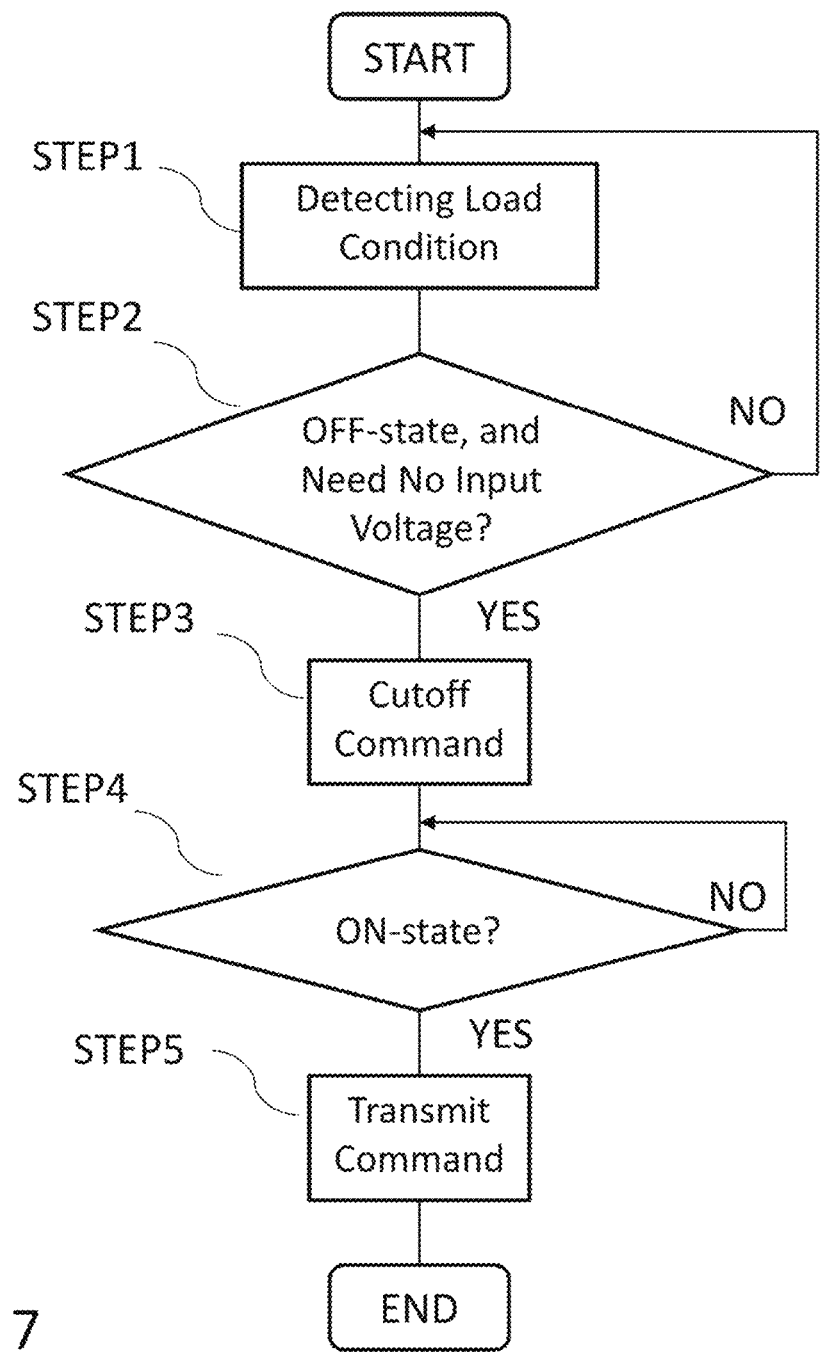
FIG. 7 is a flowchart showing an operation of DC cutoff devices of the DC power supply and distribution system according to Embodiment 3.

FIG. 7 is a flowchart showing an operation of the cutoff controller 701 of the DC power supply and distribution system according to Embodiment 3. FIG. 7 shows a series of control operations from cutoff to transmission of the DC power. In actuality, the flow from the start to the end of the flowchart is repeated by an event trigger or as a cyclic loop.

The load condition detectors 60 detect the conditions of the loads 30 and send the conditions to the cutoff controller 701 (STEP1). The cutoff controller 701 determines, depending on the conditions of the loads 30, whether for the DC cutoff devices 70 to transmit or cut off the DC powers. When all loads of the loads 30, connected from the DC cutoff devices 70 are off-state and needs no input voltages (STEP2), the cutoff controller 701 commands the DC cutoff device 70 corresponding to the at least one load to cut off the DC power being output to the all loads (STEP3). The corresponding DC cutoff device 70 executes its cutoff operation in accordance with the cutoff command.

Even during cutoff of the DC powers supplied to the all loads, the cutoff controller 701 continues monitoring the conditions of the loads 30 detected by the load condition detector 60. When the condition of at least one of the loads 30 connected from the DC cutoff devices 70 becomes on-state (STEP4), the cutoff controller 701 commands the corresponding DC cutoff device 70 to transmit the DC power (STEP5).

In some cases, however, the load condition detectors 60 cannot detect the conditions of some loads of the loads 30 due to cut off of the DC cutoff devices 70. Hence, in a case of the loads 30 being, for example, lighting loads and/or air-conditioning loads, the load condition detectors 60 preferable detect the conditions of the loads 30 from external devices, such as their wall switches or remote controllers controlling them, other than the loads 30.

As described above, in Embodiment 3, since the AC-DC converter 40 converts the AC power input from the AC power line 10 to the DC powers having the different voltages controlled by the voltage controller 41 and outputs the converted DC powers to the respective DC lines 1, the DC powers with voltages in accordance with the same types of the loads 30, connected from the respective DC lines 1 can be supplied, thus being able to improve the power distribution efficiency.

Moreover, Embodiment 3 provides the load condition detectors 60 and the DC cutoff devices 70, thereby being able to cut off the any of the DC powers depending on the conditions of the loads 30. For example, in a case of some of the loads 30 being lighting loads and/or air-conditioning loads, which are frequently turned on and off, connected from the AC-DC converter 40 through the respective DC lines 1, even when the distribution voltages to the loads cannot be zero during off-states thereof due to power consumption of their control power supplies and losses of the loads themselves, since the corresponding DC cutoff devices 70 cut off the DC powers depending on the conditions of the loads, power consumption of the loads can be reduced during the off-states, thus being able to improve the power efficiency.

Embodiment 4

Figure 8:
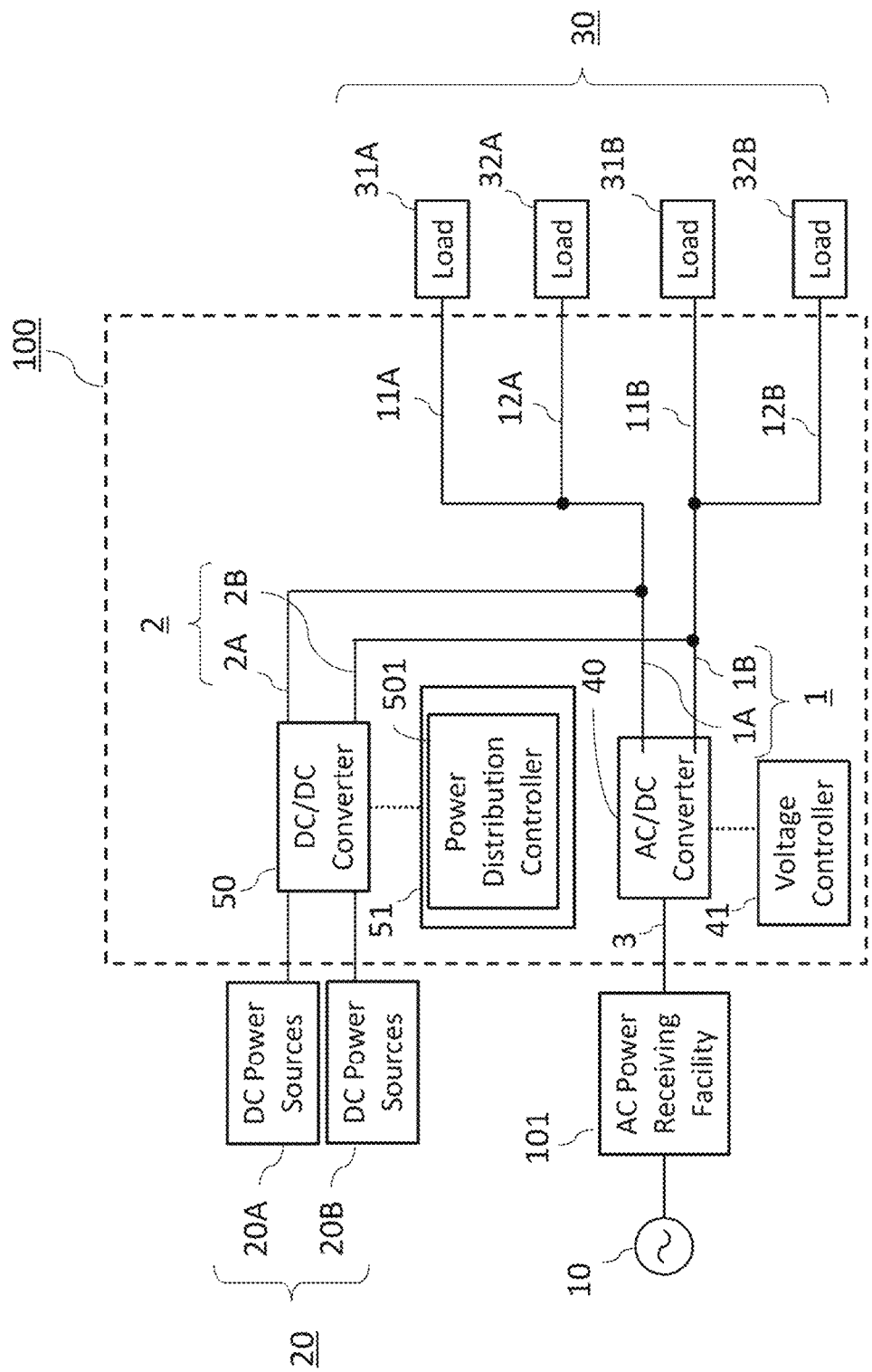
FIG. 8 is a schematic diagram showing a configuration of a DC power supply and distribution system according to Embodiment 4 of the present invention.

FIG. 8 is a schematic diagram showing a configuration of a DC power supply and distribution system according to Embodiment 4 of the present invention. As shown in FIG. 8, the DC power supply and distribution system 100 according to Embodiment 4 further includes a power distribution controller 501 for controlling the DC-DC converter 50 to distribute the DC powers to be output to the respective DC lines 2. The same descriptions as those in Embodiments 1 to 3 are omitted here, and differences therefrom are mainly described in the following.

The DC-DC converter 50 is provided connected from the output sides of the DC power sources 20. The DC-DC converter 50 is connected to the DC lines 2A, 2B. The power controller 51 controls the DC-DC converter 50 to output DC powers having predetermined different voltages.

The power controller 51 is provided with the power distribution controller 501 for distributing the DC powers converted from the DC powers input from the DC power sources 20 to the respective DC lines 2, based on the respective conversion efficiencies of the DC-DC converter 50.

Figure 9:
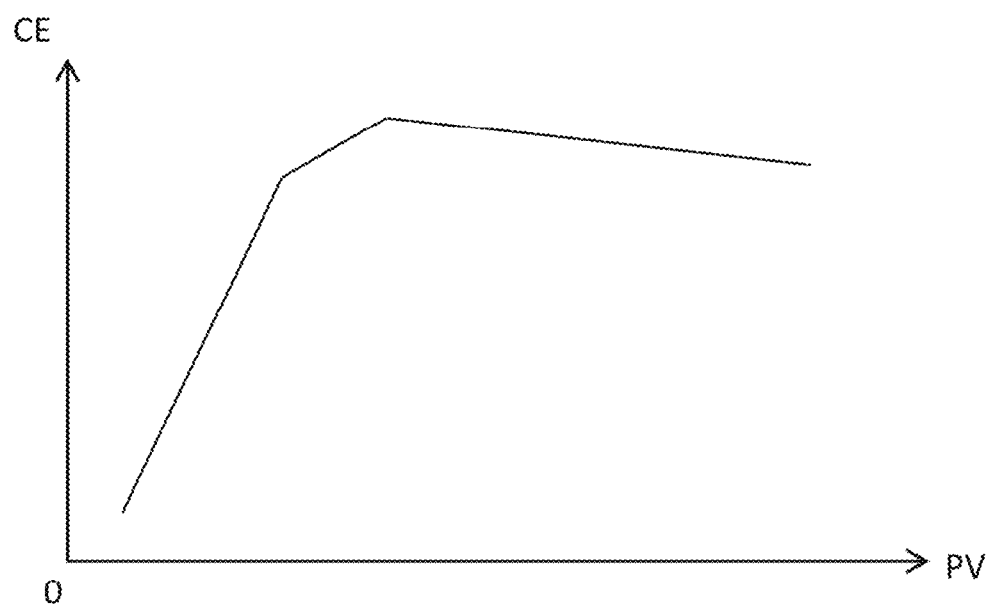
FIG. 9 is a graph for explaining a power distribution controller of the DC power supply and distribution system according to Embodiment 4.

FIG. 9 is a graph for explaining the power distribution controller of the DC power supply and distribution system according to Embodiment 4. FIG. 9 shows a relationship between the output power of and the conversion efficiency of a typical power converter, in which the vertical axis represents the conversion efficiency CE and the horizontal axis represents the output power PV. As shown in FIG. 9, the conversion efficiency of a power converter such as the AC-DC converter 40 and the DC-DC converter 50 has a tendency of becoming worse with decreasing output power.

Figure 10A:
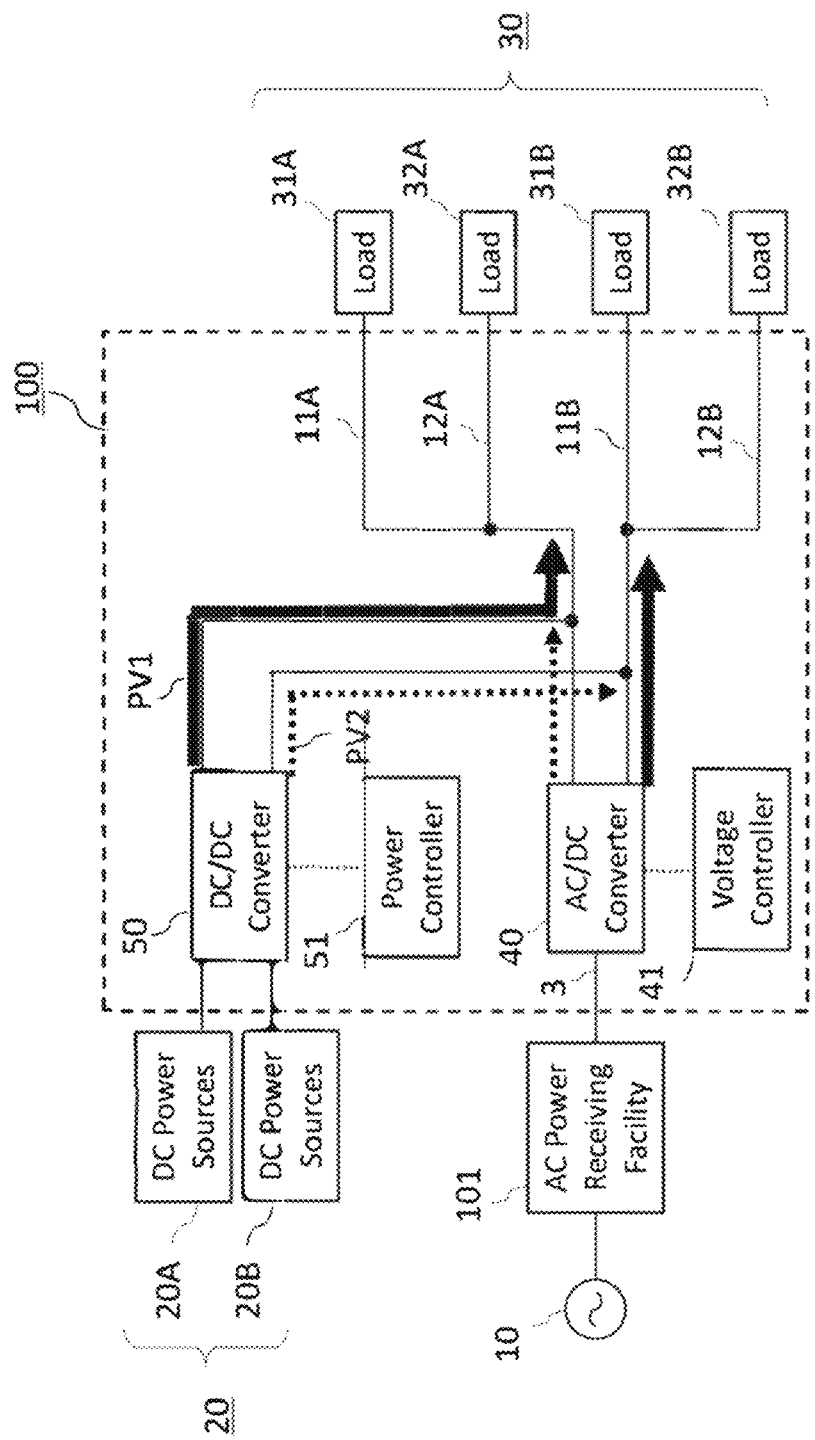
FIGS. 10A and 10B are diagrams for explaining the power distribution controller of the DC power supply and distribution system according to Embodiment 4 respectively.
Figure 10:
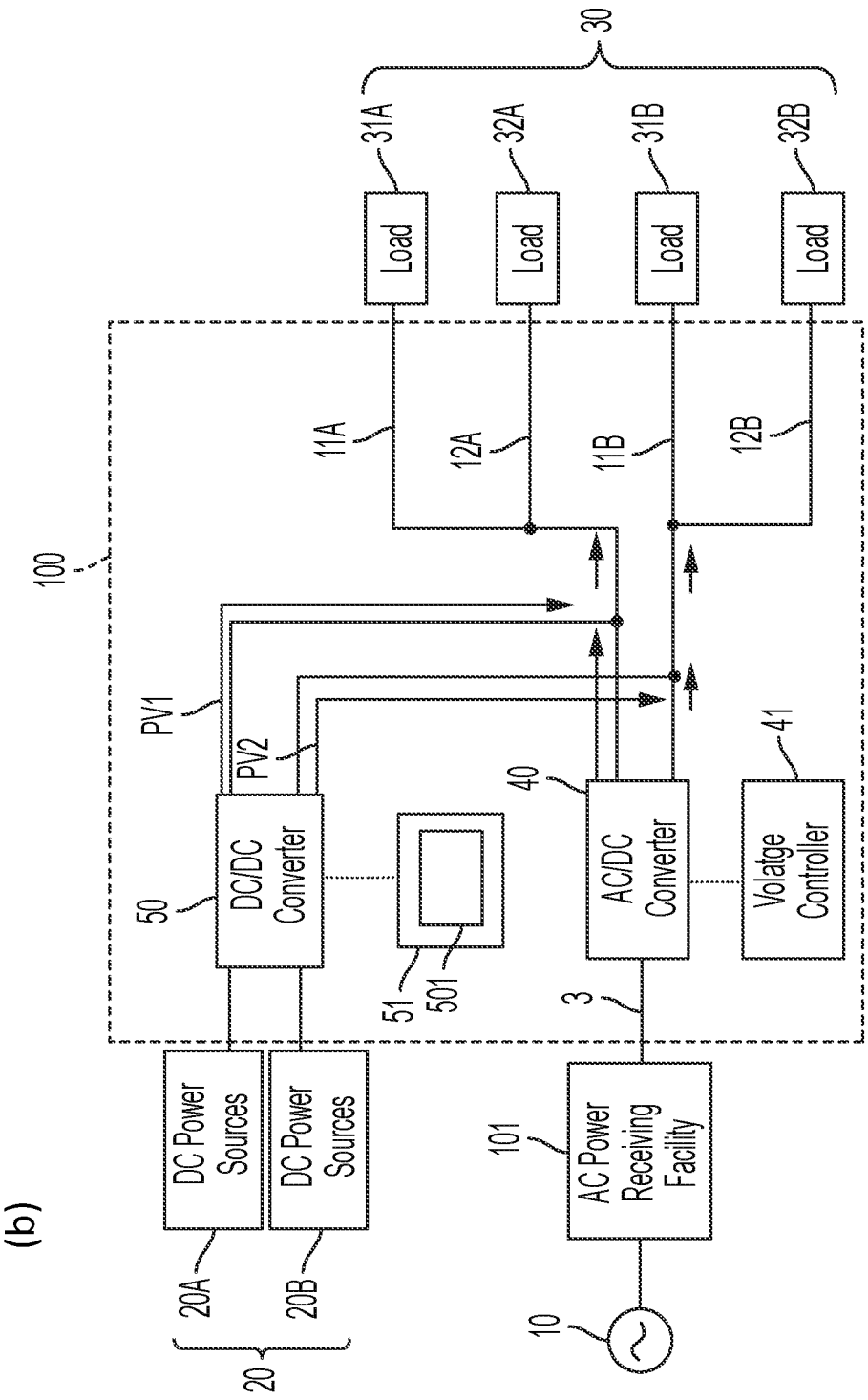

FIGS. 10A and 10B are diagrams for explaining a power distribution controller of the DC power supply and distribution system according to Embodiment 4. FIG. 10A is an example for comparison with Embodiment 4, and FIG. 10B is an example of the DC power supply and distribution system of the present invention. If the DC powers from the DC power sources 20 are output, as a DC power PV1 as shown in FIG. 10A, concentratedly to, for example, the one DC line 2A of the DC power lines 2 connected from the DC-DC converter 50, a DC power PV2 supplied to the other DC line 2B connected therefrom and the DC power supplied to the other DC line 1A connected from the AC-DC converter 40 is reduced, and this might cause deterioration of the conversion efficiencies of the DC-DC converter 50 and the AC-DC converter 40.

As shown in FIG. 10B, the power distribution controller 501 distributes and outputs the DC powers from the DC-power sources 20 to the respective DC lines 2, based on the conversion efficiencies of the AC-DC converter 40 and the DC-DC converter 50. This enables the AC-DC converter 40 and the DC-DC converter 50 to operate efficiently independent of output conditions of the DC-DC converter 50.

As described above, in Embodiment 4, the AC-DC converter 40 converts the AC power input from the AC power line 10 to the DC powers having the plurality of different voltages controlled by the voltage controller 41 and outputs the converted DC powers to the respective DC lines 1. This allows for supplying the DC powers with voltages in accordance with the types of the loads 30, connected from the respective DC lines 1, thus being able to improve the power distribution efficiency.

Moreover, Embodiment 4 further provides the power distribution controller 501 for distributing, based on the conversion efficiencies of the AC-DC converter 40 and the DC-DC converter 50, the DC powers converted from the DC powers from the DC power sources 20 to the plurality of respective DC lines 2. This allows for improving overall power distribution efficiency of the DC supply and distribution system 100. Furthermore, the DC-DC converter 50 is integrated in the single casing and outputs the DC powers with the plurality of different voltages, thereby being able to reduce the system cost without providing the DC-DC converter 50 for each of the loads 30.

Note that while Embodiments 1 to 4 describe the examples in which the plurality of DC power sources 20 are connected to the single DC-DC converter 50, the DC-DC converter 50 may be provided for each of the DC power sources 20. Furthermore, depending on the DC power source 20, its DC power may be supplied directly to the loads without providing the DC-DC converter 50.

While Embodiments 1 to 4 describe the examples in which the same types of the loads 30 are connected from the AC-DC converter 40 though the respective DC lines 1, the connection is not limited to this but different types of the loads 30 may be connected. Even in the case of connecting different types of the loads 30 from the AC-DC converter 40 though the DC lines 1, providing the voltage controller 41 enables the voltages of the DC lines 1 to be controlled to maximize the overall efficiency of the loads 30.

The plurality of constituent components disclosed in Embodiments 1 to 4 may be appropriately combined without departing from the scope and sprit of the present invention.

REFERENCE NUMERALS

100: DC supply and distribution system;
1, 1A, 1B: DC line(s) (first DC lines);
2, 2A, 2B: DC line(s) (second DC lines);
3: AC line;
10: AC power line;
101: AC power receiving facility 101;
20, 20A, 20B: DC power source(s);
30, 31A, 32A, 31B, 32B: load(s);
40: AC-DC converter;
41: voltage controller;
50: DC-DC converter;
51: power controller;
501: power distribution controller;
60: load condition detectors;
70: DC cutoff devices; and
701: cutoff controller.

The invention claimed is:

1. A DC supply and distribution system comprising:
an AC-DC converter configured to convert an AC power input from an AC power line to DC powers having a plurality of different voltages and to output the DC powers from respective output terminals of the AC-DC converter;
a voltage controller configured to control the different voltages of the DC powers to be output from the AC-DC converter;
a plurality of first DC lines connected from the respective output terminals of the AC-DC converter, to distribute to a plurality of loads the DC powers with the different voltages output from the AC-DC converter; and
load condition detectors configured to detect conditions of the loads,
wherein the voltage controller determines, based on the conditions of the loads detected by the load condition detectors, allowable voltage ranges between highest allowable minimum input voltages and lowest allowable maximum input voltages among allowable minimum input voltages and allowable maximum input voltages of the loads connected from the AC-DC converter through the first DC lines, and calculates, within the allowable voltage ranges, the different voltages of the DC powers so that an overall efficiency of the loads converter is improved, to control the AC-DC converter to output the DC powers with the calculated voltages to the respective first DC lines.

2. The DC supply and distribution system of claim 1, wherein the first DC lines are provided for respective types of the loads, and the voltage controller controls the AC-DC converter so that the different voltages of the DC powers to be output from the AC-DC converter have voltages in accordance with the respective types of the loads.

3. The DC supply and distribution system of claim 1, wherein the voltage controller determines, based on the conditions of the loads detected by the load condition detectors, the allowable voltage ranges between the highest allowable minimum input voltages and the lowest allowable maximum input voltages among the allowable minimum input voltages and the allowable maximum input voltages of the loads, connected from the AC-DC converter through the first DC lines, and calculates, within the allowable voltage ranges, the different voltages of the DC powers so that an overall efficiency of the loads is maximized, to control the AC-DC converter to output the DC powers with the calculated different voltages to the respective first DC lines.

4. The DC supply and distribution system of claim 2, wherein the voltage controller determines, based on the conditions of the loads detected by the load condition detectors, the allowable voltage ranges between the highest allowable minimum input voltages and the lowest allowable maximum input voltages among the allowable minimum input voltages and the allowable maximum input voltages of the loads, connected from the AC-DC converter through the first DC lines, and calculates, within the allowable voltage ranges, the different voltages of the DC powers so that an overall efficiency of the loads is maximized, to control the AC-DC converter to output the DC powers with the calculated different voltages to the respective first DC lines.

5. The DC supply and distribution system of claim 1, wherein the AC-DC converter includes an AC-DC conversion circuit configured to convert the AC power to a DC power and a buck-boost circuit configured to boost or step-down the converted DC powers to output the DC powers having the different voltages, and the AC-DC conversion circuit and the buck-boost circuit are integrated in a single casing.

6. The DC supply and distribution system of claim 1, further comprising:
a DC-DC converter configured to convert a DC power input from at least one DC power source to the DC powers having the plurality of different voltages to output the converted DC powers from respective output terminals of the DC-DC converter;
a power controller configured to control the different voltages of the DC powers to be output from the DC-DC converter; and
a plurality of second DC lines connected from the respective output terminals of the DC-DC converter, to distribute to the loads the DC powers with the plurality of different voltages output from the DC-DC converter.

7. The DC supply and distribution system of claim 2, further comprising:
a DC-DC converter configured to convert a DC power input from at least one DC power source to the DC powers having the plurality of different voltages to output the converted DC powers from respective output terminals of the DC-DC converter;
a power controller configured to control the different voltages of the DC powers to be output from the DC-DC converter; and
a plurality of second DC lines connected from the respective output terminals of the DC-DC converter, to distribute to the loads the DC powers with the plurality of different voltages output from the DC-DC converter.

8. The DC supply and distribution system of claim 3, further comprising:
a DC-DC converter configured to convert a DC power input from at least one DC power source to the DC powers having the plurality of different voltages to output the converted DC powers from respective output terminals of the DC-DC converter;
a power controller configured to control the different voltages of the DC powers to be output from the DC-DC converter; and
a plurality of second DC lines connected from the respective output terminals of the DC-DC converter, to distribute to the loads the DC powers with the plurality of different voltages output from the DC-DC converter.

9. The DC supply and distribution system of claim 4, further comprising:
a DC-DC converter configured to convert a DC power input from at least one DC power source to the DC powers having the plurality of different voltages to output the converted DC powers from respective output terminals of the DC-DC converter;
a power controller configured to control the different voltages of the DC powers to be output from the DC-DC converter; and
a plurality of second DC lines connected from the respective output terminals of the DC-DC converter, to distribute to the loads the DC powers with the plurality of different voltages output from the DC-DC converter.

10. The DC supply and distribution system of claim 5, further comprising:
a DC-DC converter configured to convert a DC power input from at least one DC power source to the DC powers having the plurality of different voltages to output the converted DC powers from respective output terminals of the DC-DC converter;
a power controller configured to control the different voltages of the DC powers to be output from the DC-DC converter; and
a plurality of second DC lines connected from the respective output terminals of the DC-DC converter, to distribute to the loads the DC powers with the plurality of different voltages output from the DC-DC converter.

11. The DC supply and distribution system of claim 6, wherein the power controller is provided with a power distribution controller configured to distribute, to the second DC lines connected from the DC-DC converter, the DC powers converted from the DC power input from the at least one DC power source, based on at least either conversion efficiency of the AC-DC converter and the DC-DC converter.

12. The DC supply and distribution system of claim 1, further comprising
DC cutoff devices provided between the AC-DC converter and the loads, to cut off the DC powers from the AC-DC converter.

13. The DC supply and distribution system of claim 12, wherein
the DC cutoff devices have a cut-off controller configured to remotely command the DC cutoff devices to transmit and cutoff of the DC powers.

14. A DC supply and distribution system comprising:
- an AC-DC converter configured to convert an AC power input from an AC power line to DC powers having a plurality of different voltages and to output the DC powers from respective output terminals of the AC-DC converter;
- a voltage controller configured to control the different voltages of the DC powers to be output from the AC-DC converter;
- a plurality of first DC lines connected from the respective output terminals of the AC-DC converter, to distribute to a plurality of loads the DC powers with the different voltages output from the AC-DC converter;
- a DC-DC converter configured to convert a DC power input from at least one DC power source to the DC powers having the plurality of different voltages to output the converted DC powers from respective output terminals of the DC-DC converter;
- a power controller configured to control the different voltages of the DC powers to be output from the DC-DC converter; and
- a plurality of second DC lines connected from the respective output terminals of the DC-DC converter, to distribute to the loads the DC powers with the plurality of different voltages output from the DC-DC converter, wherein the voltage controller controls the different voltages of the DC powers to be output from the AC-DC converter to improve overall power efficiency including of the loads and the AC-DC converter, and wherein the second DC lines connected from the DC-DC converter are respectively connected to the first DC lines midway between the AC-DC converter and the loads.

15. The DC supply and distribution system of claim 14, wherein the power controller is provided with a power distribution controller configured to distribute, to the second DC lines connected from the DC-DC converter, the DC powers converted from the at least one DC power input from the DC power source, based on at least either conversion efficiency of the AC-DC converter and the DC-DC converter.

16. The DC supply and distribution system of claim 14, further comprising
- DC cutoff devices provided between the AC-DC converter and the loads, to cut off the DC powers from the AC-DC converter.

17. The DC supply and distribution system of claim 16, wherein
the DC cutoff devices have a cut-off controller configured to remotely command the DC cutoff devices to transmit and cutoff of the DC powers.

18. A DC supply and distribution system comprising:
- an AC-DC converter configured to convert an AC power input from an AC power line to DC powers having a plurality of different voltages to output the converted DC powers to a plurality of respective first DC lines distributing the DC powers to loads;
- a voltage controller configured to control the different voltages of the DC powers to be output from the AC-DC converter; and
- load condition detectors configured to detect conditions of the respective loads, wherein the voltage controller determines, based on the conditions of the loads detected by the load condition detectors, allowable voltage ranges between highest allowable minimum input voltages and lowest allowable maximum input voltages among allowable minimum input voltages and allowable maximum input voltages of the loads connected from the AC-DC converter through the first DC lines, and calculates, within the allowable voltage ranges, the different voltages of the DC powers so that an overall efficiency of the loads is improved, to control the AC-DC converter to output the DC powers with the calculated different voltages to the respective first DC lines.

* * * * *